Patented Oct. 9, 1923.

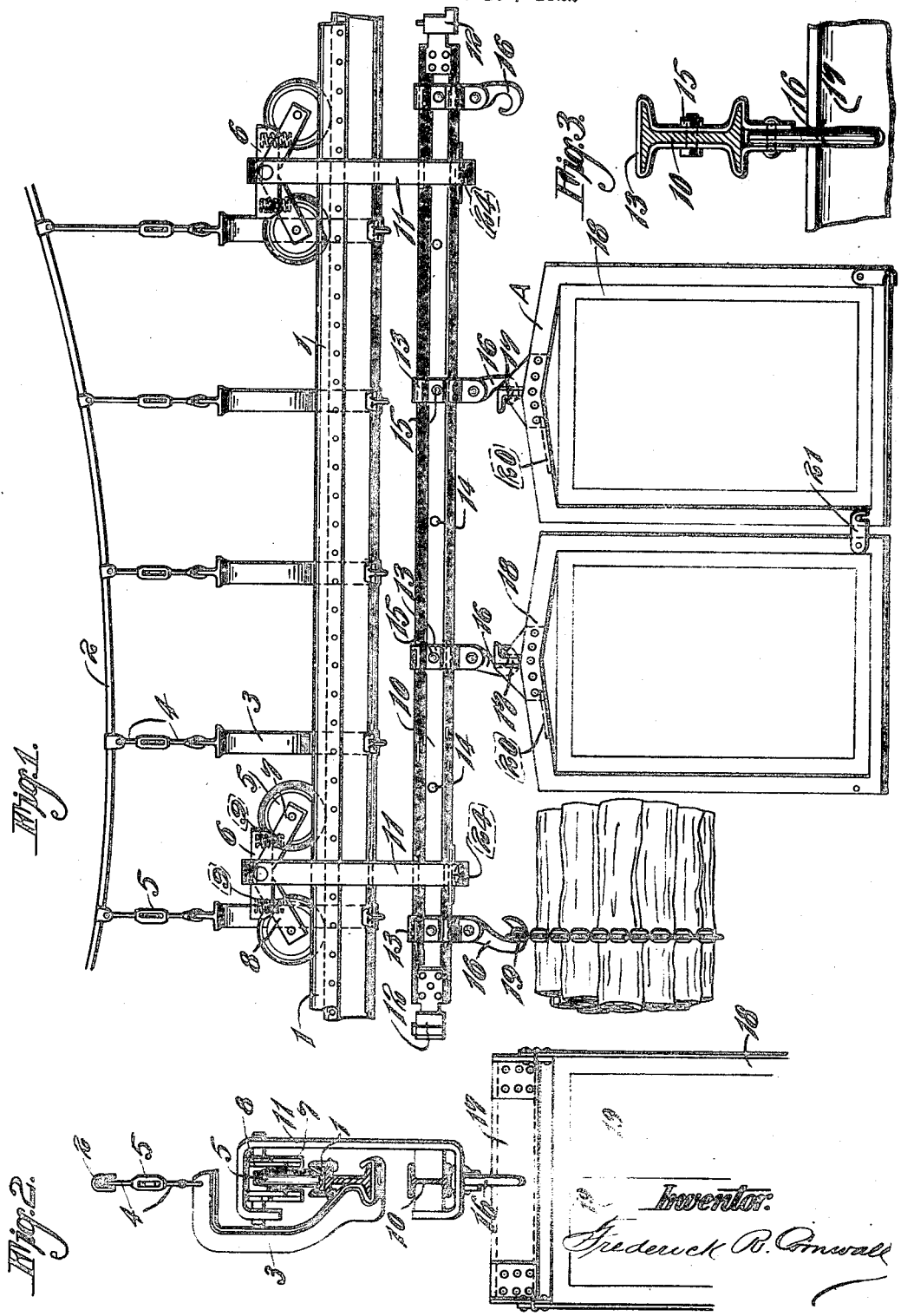

1,469,998

UNITED STATES PATENT OFFICE.

FREDERICK R. CORNWALL, OF ST. LOUIS, MISSOURI; MAY BUSHALL CORNWALL EXECUTRIX OF SAID FREDERICK R. CORNWALL, DECEASED, ASSIGNOR, BY MESNE ASSIGNMENTS, TO MAY B. CORNWALL, OF ST. LOUIS, MISSOURI.

MONORAIL CARRIER.

Application filed November 15, 1922. Serial No. 601,176.

*To all whom it may concern:*

Be it known that I, FREDERICK R. CORNWALL, a citizen of the United States, residing at St. Louis, Missouri, have invented a certain new and useful Improvement in Monorail Carriers, of which the following is a full, clear, and exact description, such as will enable others skilled in the art to which it appertains to make and use the same, reference being had to the accompanying drawings, forming part of this application.

My invention relates to monorail transportation systems of the general type described in my copending application Serial Number 537,329, filed February 17, 1922, and consists in a carrier construction especially adapted for freight transportation.

The main object of my invention is to provide equipment for transporting freight wherein each carrier is adapted to support one or more units or containers each of which forms a complete shipment independently of the other containers which may be mounted on the carrier. This adapts my present system to form a link in a transportation route in which lading containers are transported by truck, railway cars, barge, etc., without handling the lading at each transfer.

Another object of my invention is to provide a truck and carrier construction which will be simple and rugged and at the same time possess the flexibility necessary to prevent undue deterioration of the trackway and the supporting means for the latter.

In the accompanying drawings which illustrate a selected embodiment of my invention—

Figure 1 illustrates a typical installation of a monorail system including one of my improved carriers and showing the latter adapted for two different kinds of service, namely, the hauling of logs or of a plurality of merchandise containers.

Figure 2 is a transverse section through the trail and carrier frame and showing a track supporting element, a truck, the frame mounting on the truck, and a shipping container in elevation.

Figure 3 is a cross section of the carrier frame and an elevation of the lading support element drawn to an enlarged scale.

The monorail track 1 is supported from an overhead cable 2 by means of a plurality of hangers each comprising a rigid channel-like member 3 and an adjustable member 4. The track is adapted to retain the tandem wheels 5 of a truck 6 which is described and claimed in my copending application, Serial No. 574,947, filed July 14, 1922, and from which this application is divided.

In each of these trucks 2, wheel pieces 7 and 8 overlap each other so as to form opposed seats for coil springs 9 compressed therebetween to form a simple rugged yielding load supporting structure.

The carrier frame 10 is supported from trucks 6 by depending channel-like bars 11 arranged on that side of the truck opposite to track supporting members 3. The frame 10 is here shown as a structural I-beam section extending between and beyond suspension bars 11 and provided with suitable couplers 12 at its ends. Slidably mounted upon frame 10 is a plurality of hangers 13 and at predetermined intervals along frame 10, openings 14 are provided by means of which hangers 13 may be definitely positioned upon the frame by the use of suitable bolts or other securing elements 15. A hook 16 is pivotally mounted on each hanger 13 and is adapted to engage a bar 17 on a box-like container 18 or to engage links of a chain or similar fastening device 19 for supporting such merchandise as logs, lumber or other merchandise of similar structure.

The containers 18 are suitably reinforced by structural elements and are equipped with doors 19, hoppers 20 or other load receiving and discharging means according to the class of merchandise for which they are intended. By positioning the containers upon beam 10 so that their respective sides provided with doors are opposed to another container wall, it will be impossible to open the doors and remove the contents of a container without first removing it from the carrier beam. The contents are thus safeguarded against thieves en route.

Means for insuring such positioning of the containers may be provided by facing all of hooks 16 on beam 10 toward the middle of the beam and by constructing the hook engaging cross bars 17 of each container so that it may be engaged by the hook from one side only. By utilizing a channel section for the cross bars and so arranging each channel that its hook receiving opening is presented in the opposite direction to the door equipped walls of the container, it follows that doors 19 will always face the middle of the beam. In loading the beam, if two containers only are to be carried, they should be suspended from the hooks near the middle of the beam so as to balance the load, in which case the doors of both containers would oppose each other. If containers are suspended from all of the hooks, the doors of the outer containers would be opposed to a blank adjacent wall. It is apparent then that any proper loading will insure the desired locking of an entrance to any container. Each of these containers may be mounted upon the carrier frame independently of the others and may be unshipped at any point thereby enabling the carrier to make a continuous journey without delays due to unloading or to being cut out of a train of carriers and side tracking.

Where two or more containers are supported upon one carrier it is necessary to prevent their swinging against each other and for this purpose I provide links or bars 21 adapted to engage two adjacent containers and brace them one from the other so that while they are free to swing upon their pivotal suspension points they will be compelled to swing in unison and without damage to each other.

It will be understood that the containers 18 may be made in various sizes for different classes of merchandise. Obviously, a container intended to carry bulky goods, such as furniture or machinery, would necessarily be larger and probably of a different construction than that required for grain or ore. Some containers might require a plurality of brackets 13. Some merchandise could be suspended from the carrier without any container. The logs shown are only one form of such merchandise. Hence the adjustability of brackets 13 along carrier 10 is a material advantage.

The carrier frame is pivotally mounted upon bars 11 as indicated at 24 in Figure 1 and with the pivotal mounting of bars 11 upon tracks 6 and of hooks 16 upon hangers 13 it is evident that the load is freely supported upon the trucks and rails so as to swing longitudinally of the carrier and rail, thereby relieving the latter from excessive stresses such as would result from a carrier rigidly mounted upon the trucks or a load otherwise rigidly supported. The contour of wheels 5 and the tread of rail 1 provides for a swinging movement of the trucks, carrier frame, and load as a whole transversely of the track about the contact of the rail therewith as a pivot and the mounting of the carrier frame upon bars 11 provides for a limited swinging movement of the carrier frame and load on the bars 11, but the mounting of hangers 13 on frame 10, of hooks 16 on the hangers, and of the containers 18 upon the hooks is arranged so that the different container units cannot swing transversely of the rail relative to frame 10. This construction with the use of links 21 or 23 insure the load as a whole swinging as a unit both longitudinally and transversely of the track. Consequently movements which would tend to swing part of the load to the right, another part to the left, part to the rear, and another part to the front are damped one by the other and a component movement results which will always be less in extent than any single movement. Furthermore twisting or weaving of the carrier frame and the trucks is eliminated.

Various details in the construction and arrangement of parts of my carrier may be made without departing from the spirit of the invention disclosed and expressed in the following claims.

I claim:

1. In a monorail carrier, spaced wheeled trucks, a horizontal beam carried by said trucks, and a plurality of box-like carriers each pivotally suspended from said beam, and means preventing contact of said containers with each other.

2. In a monorail system, a track, wheeled trucks mounted thereon, a frame carried by said trucks, a plurality of lading containers independently and removably secured to said frame at intervals, and means for bracing each of said containers against its adjacent container.

3. In a monorail system, a rail, a wheeled truck mounted thereon, a frame suspended from said truck, a plurality of load containers independently suspended from said frame, and means for uniting all of said containers to form a practically rigid car body carried by said frame.

4. In a monorail system, a rail, wheeled trucks mounted thereon, a beam carried by said trucks, and load supporting members pivotally mounted on said beam and adjustable longitudinally of the latter at definite intervals.

5. A wheeled supported horizontal beam, a plurality of freight containers suspended therefrom, and connections between the lower portions of said containers.

6. A wheeled supported horizontal beam, a plurality of freight containers suspended therefrom, and means for spacing said containers apart at their tops and bottoms.

7. In a monorail carrier, a wheel supported horizontal frame, and a plurality of merchandise containers suspended therefrom and provided with doors in the opposing faces of adjacent containers.

8. In a monorail carrier, a wheel supported horizontal frame, and a plurality of merchandise containers suspended therefrom, each having a wall provided with a door, and means whereby said containers can only be suspended from said frame with their doors facing the middle of said frame.

9. In a monorail carrier, a wheel supported longitudinal beam, a plurality of hooks mounted on said beam all facing the middle of said beam, a plurality of freight containers each provided with a hook engaging element and presenting a hook receiving opening in a single direction and a wall in each container, having doors, facing the opposite direction.

10. In a monorail carrier, a wheel supported longitudinal beam, a plurality of hooks mounted on said beam all facing the middle of said beam, a plurality of freight containers each including a door equipped wall and a channel-shaped element across its top having a hook receiving opening in its web and having its flanges facing the same direction as said door equipped wall.

In testimony whereof I hereunto affix my signature this 13th day of November, 1922.

FREDERICK R. CORNWALL.